Aug. 12, 1941.  A. SCHWARZ  2,252,415
PROCESS AND APPARATUS FOR PROVIDING INTERNAL COMBUSTION
ENGINES WITH EXPLOSIVE CHARGES
Filed March 4, 1939  2 Sheets-Sheet 2
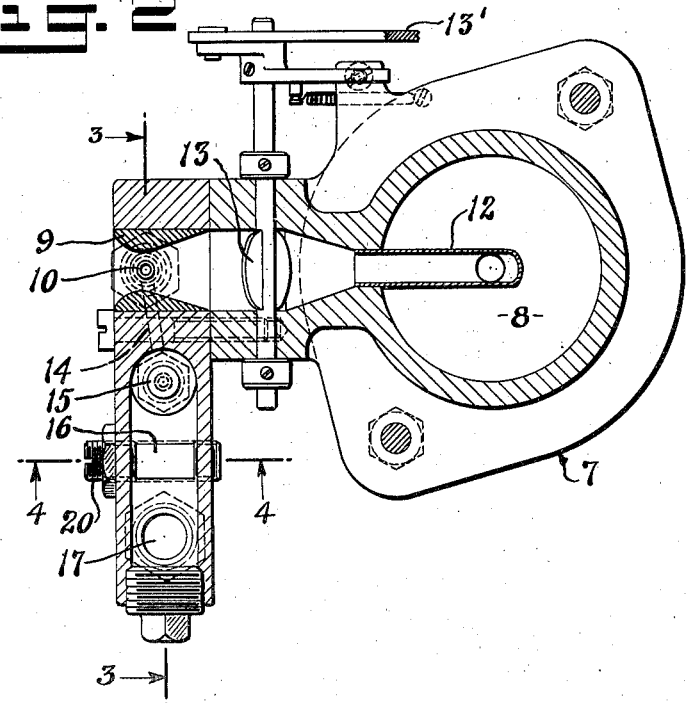
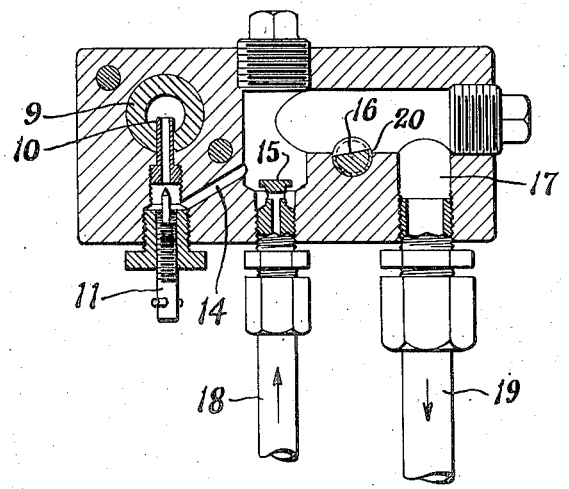
INVENTOR.
Alfred Schwarz
BY
ATTORNEYS.

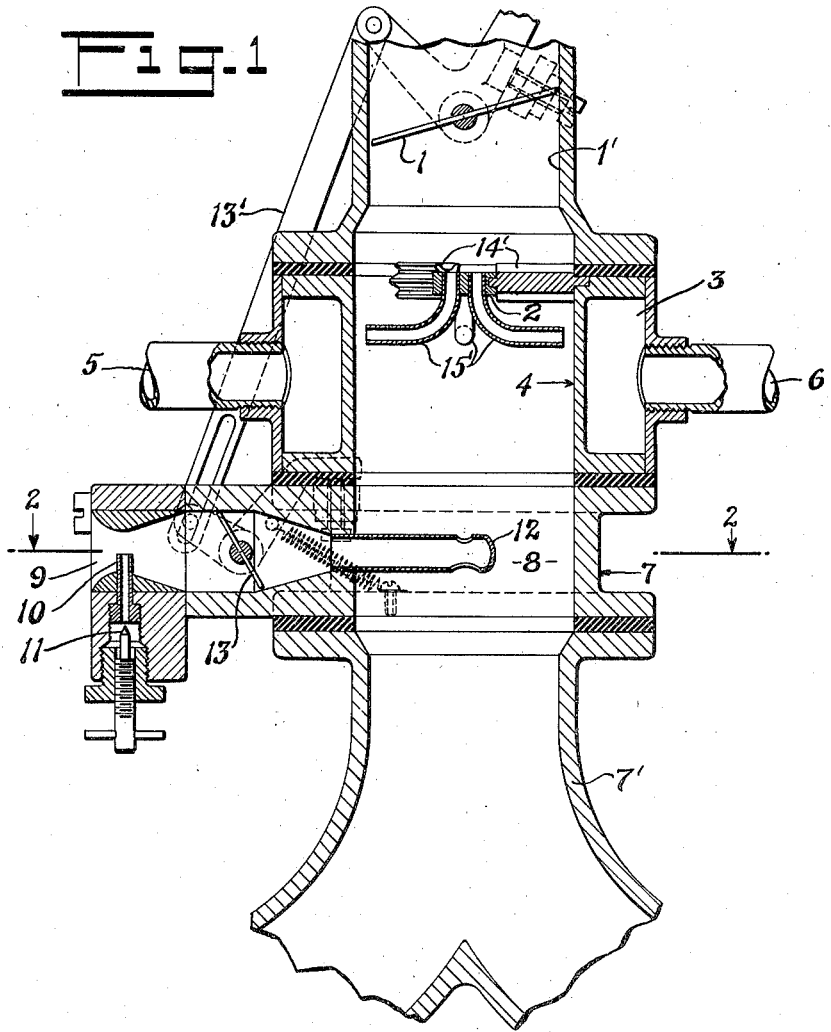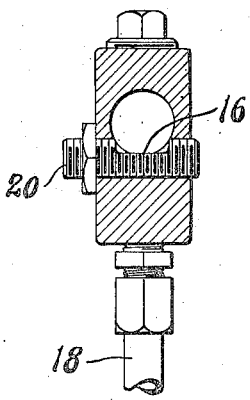

Patented Aug. 12, 1941

2,252,415

UNITED STATES PATENT OFFICE 2,252,415

PROCESS AND APPARATUS FOR PROVIDING INTERNAL COMBUSTION ENGINES WITH EXPLOSIVE CHARGES

Alfred Schwarz, Ridgewood, N. J., assignor to Automotive Economy Corporation, Jersey City, N. J., a corporation of Delaware Application March 4, 1939, Serial No. 259,806

3 Claims. (Cl. 123—127)

This invention relates to process and apparatus for providing an internal combustion engine with an explosive charge; and the invention is particularly adapted for use where it is desired to utilize a relatively low octane or low compression primary fuel in major proportions in conjunction with a minor amount of a fuel of higher octane value having additional conditioning characteristics.

In my application Ser. No. 219,535, filed July 16, 1938, I have shown a means to vaporize the motor fuel by the use of a deflector projecting said motor fuel against heated surfaces for the purpose of supplying the latent heat of vaporization and for the purpose of eliminating the customary heating of the intake manifold, which overheats the charge, that is, the fuel, inclusive of the air, thus causing a low volumetric efficiency. The present invention contemplates the use of the same method as described in the previous application above mentioned, and in addition thereto, the supplying of a liquid, such as alcohol or a mixture of alcohol and water or similar mixtures, below the first mentioned deflector and heating means, to cause further cooling of the charge and to introduce anti-knock values preferable after the fuel itself has been supplied with its latent heat of vaporization.

I have found that it is of great importance to supply the fuel itself with its latent heat of vaporization and thereafter absorb any excess heat by vaporizing additional material, such as alcohol or alcohol and water, etc.

The invention consists in the method herein described and in the novel features, arrangement, construction and combination of parts of the apparatus and means hereinafter described in accordance with certain preferred embodiments thereof, and the invention will be more particularly pointed out in the appended claims.

Further objects of the invention will more fully appear from the following description taken in connection with the accompanying drawings illustrating by way of example the preferred embodiment of the apparatus used in carrying out the method.

Referring to the accompanying drawings, in which the same reference characters indicate the same parts in the various views:

Fig. 1 is a side elevation in section of a preferred form of apparatus for carrying out the method showing an engine throttle, a deflector and heating surfaces for fuel vaporization, and below this an induction means to draw in additional air to vaporize an alcohol-water mixture or any other suitable substance which it may be desired to use;

Fig. 2 is a horizontal cross section taken at 2—2 of Fig. 1, showing further details of an induction device;

Fig. 3 is a vertical cross section taken at 3—3 of Fig. 2 showing a section through an anti-knock liquid and air metering device; and Fig. 4 is a vertical cross section taken at 4—4 of Fig. 2 through the anti-knock mixture passage arranged to maintain a fixed lever in relation to the supply jet during operation.

Referring more particularly to Fig. 1: the engine throttle of a down-draft carburetor (not shown) is designated as 1 and is positioned in the outlet throat or passage of a carburetor designated 1'. A heating section designated in its entirety as 4 is positioned beneath the throttle 1 and is provided with a throat or passage forming a continuation of the outlet passage 1' of the carburetor. The inner wall of the heating section 4 is surrounded by a heat jacket 3 which is heated by the exhaust from the engine which is delivered thereto by a tube 5 and passes therefrom through the tube 6. A deflector 2 is supported on the axis of the passage in the heating section 4 by means of corrugated rods 14' whose outer ends are secured to the inner walls of the heating unit 4 and whose inner ends are secured to the deflector 2. The deflector is preferably provided with downwardly and outwardly radially extending tubes 15'; the purpose of the corrugated rods 14' and tubes 15' being to deflect or conduct the particles of fluid against the annular interior heated walls of the heating section 4; so that the particles thus projected radially outwardly against the annular heated wall are supplied with the latent heat of vaporization.

The anti-knock feeding device is designated in its entirety as 7 and is secured to the lower end of the heating section 4; being provided with a cylindrical opening or passageway 8 forming a continuation of the passageway in the heating section 4. It will therefore be seen that the fuel mixture which has received its latent heat of vaporization passes from the heating section 4 through the cylindrical opening 8. The section 7 is provided with a Venturi throat 9 through which an additional air stream is induced by the suction of the engine through the intermediary of the intake manifold 7'. The jet 10 is positioned in the throat of the venturi 9 and supplies anti-knock liquid through a needle valve; and the mixture of fluid and air passes through a nozzle 12 which serves to introduce this substantially into the center of the main fuel-air stream. A throttle 13 is interposed in the passage between the venturi 9 and nozzle 12 and serves to control the flow through the nozzle 12. The flow of the anti-knock mixture through the nozzle 12 is usually not used during the application of the throttle 1 and is only introduced at times when a maximum amount of air with additional motor fuel is supplied. To effect this, the throttle 13 may be connected by a link 13' to the throttle 1 in the manner indicated. The nozzle 12 is therefore controlled by the throttle 13 and the venturi 9 through which additional air is supplied.

Referring to Figs. 2 and 3, the jet 10 is supplied through a drill hole 14 from the fuel supply inlet 15 which enters through the supply pipe 18. A constant supply is provided for by supplying an excess through pipe 18 and passing the fluid over a weir 16, through the overflow chamber 17 and thence through the pipe 19 back to the supply tank. The fluid may be supplied through the pipe 18 by any suitable means, such as a pump. The weir 16 is formed by the flattened surface of an adjustable bolt 20 (Fig. 4) which permits the level of the weir to be lowered or raised by means of rotation of the bolt 20, which may then be locked in the desired position by the cooperating lock nut.

The operation of the device comprises passing the primary fuel mixture from the carburetor past the throttle valve 1, through the outlet passage 1', over the deflecting means 2, by which it is deflected outwardly against the interior heated surface of the heating section 4, thence downwardly through the passage 8 of the section 7, where it is admixed with the stream entering through nozzle 12 comprising the anti-knock mixture, in connection with which it is noted that the supply of said anti-knock mixture is maintained at a constant level by means of the overflow system previously described.

As an anti-knock fluid I may use alcohol and water in suitable proportion: for example, 30% of alcohol and 70% of water. I may also use acetone in similar proportions.

Having thus described my invention with particularity with reference to the preferred method of carrying out the same and in connection with the present preferred apparatus for carrying out the same, it will be obvious to those skilled in the art, after understanding my invention, that various changes and modifications may be made therein without departing from the spirit and scope of my invention, and I aim in the appended claims to cover such changes and modifications as are within the scope of the invention.

What I claim is:

1. The method of supplying an explosive charge to an internal combustion engine which comprises, mixing a relatively low compression fuel with air to form an air stream of said mixture, passing said air stream against a heated surface to further vaporize the same and thereafter mixing with said vaporized mixture a mixture containing a partial fuel and a partial anti-knock value and having a heat absorbing characteristic, to thereby substantially reduce the temperature of said vaporized fuel mixture and provide a resultant charge having increased volumetric efficiency and anti-knock characteristics, and introducing said charge into the explosion chambers of an internal combustion engine.

2. The method of supplying an explosive charge to an internal combustion engine which comprises, heating a primary mixture of fuel and air comprising relatively low compression fuel and air in an amount substantially less than that required for the charge on substantially open throttle, the heat so supplied being sufficient to furnish the latent heat of vaporization for said low compression fuel, mixing a secondary supply of air with alcohol to provide a secondary mixture of substantially reduced temperature and introducing said secondary mixture into a moving stream of said heated primary mixture, to thereby supply the remaining requisite air and anti-knock value to the resultant charge in the form of a cooling medium having fuel value.

3. Apparatus for providing an internal combustion engine with an explosive charge, comprising a heating section adapted to be inserted between a carburetor throttle and engine intake manifold and having said heating section comprising an interior heating surface in the form of a passageway in communication with the outlet of said carburetor and means for heating said surface and a second section between said heating section and said intake manifold, said second section comprising a mixing chamber in communication with the said passageway in said heating section, a nozzle extending within said mixing chamber for admitting a secondary fluid-air mixture therein, an air passage in communication with said nozzle and means for admitting said fluid and air thereto, and means for controlling the admission of said secondary mixture to said nozzle, said means being operable to admit said secondary mixture only upon open throttle positions of said carburetor.

ALFRED SCHWARZ.